(12) United States Patent
Garcia et al.

(10) Patent No.: US 10,659,145 B2
(45) Date of Patent: May 19, 2020

(54) SIMULATING RECEPTION OF TRANSMISSIONS

(71) Applicant: Aireon LLC, McLean, VA (US)

(72) Inventors: Michael A. Garcia, Ashburn, VA (US); John Dolan, Chantilly, VA (US)

(73) Assignee: Aireon LLC, McLean, VA (US)

( * ) Notice: Subject to any disclaimer, the term of this patent is extended or adjusted under 35 U.S.C. 154(b) by 152 days.

(21) Appl. No.: 15/403,383

(22) Filed: Jan. 11, 2017

(65) Prior Publication Data
US 2018/0198516 A1  Jul. 12, 2018

(51) Int. Cl.
| H04B 7/185 | (2006.01) |
|---|---|
| G08G 5/00 | (2006.01) |
| H04W 52/22 | (2009.01) |
| H04B 17/391 | (2015.01) |

(52) U.S. Cl.
CPC ....... *H04B 7/18506* (2013.01); *G08G 5/0026* (2013.01); *G08G 5/0082* (2013.01); *H04B 7/18508* (2013.01); *H04B 17/3912* (2015.01); *H04W 52/223* (2013.01)

(58) Field of Classification Search
CPC .. H04B 7/18506; H04B 17/3912; G01S 19/03
See application file for complete search history.

(56) References Cited

U.S. PATENT DOCUMENTS

| 5,995,841 A * | 11/1999 | King ............... | H04B 7/195 455/427 |
|---|---|---|---|
| 6,052,561 A * | 4/2000 | Rudowicz .......... | H04B 7/18547 455/13.1 |
| 6,567,525 B1 | 5/2003 | Sapiejewski | |
| 2002/0021247 A1* | 2/2002 | Smith ................. | G01S 13/781 342/450 |

(Continued)

OTHER PUBLICATIONS

Shkelzen Cakaj, Krešimir Malarić, Arpad L. Scholtz, Modelling of Interference Caused by Uplink Signal for Low Earth Orbiting Satellite Ground Stations, Jun. 2008, Vienna University of Technology, pp. 189-191.*

(Continued)

*Primary Examiner* — Ajit Patel
*Assistant Examiner* — Wilfred Thomas
(74) *Attorney, Agent, or Firm* — Baker Botts L.L.P.

(57) ABSTRACT

In one implementation, a method includes receiving simulated RF transmission data indicative of anticipated RF transmissions from a plurality of transmitters, wherein individual anticipated RF transmissions carry corresponding messages, and simulated position data indicative of an anticipated position of each of the plurality of transmitters. The method further includes modeling characteristics of a communications channel expected between a satellite-based receiver and at least some of the transmitters, wherein the satellite-based receiver is configured to define one or more beams for receiving anticipated RF transmissions. The method additionally includes determining a likelihood of the (Continued)

receiver successfully extracting one or more components of a message from one of the anticipated RF transmissions based on at least the simulated RF transmission data, the simulated position data, and the modeled characteristics of the communications channel.

20 Claims, 5 Drawing Sheets

(56) References Cited

U.S. PATENT DOCUMENTS

| | | | | |
|---|---|---|---|---|
| 2006/0078061 | A1* | 4/2006 | Horisaki | H04L 1/0045 375/261 |
| 2007/0159382 | A1* | 7/2007 | Joo | G01S 19/11 342/353 |
| 2008/0086670 | A1* | 4/2008 | Krouk | H03M 13/1108 714/752 |
| 2012/0215433 | A1* | 8/2012 | Subbu | G06Q 10/047 701/120 |
| 2014/0002293 | A1* | 1/2014 | Behrens | G08G 5/0013 342/36 |
| 2014/0327581 | A1* | 11/2014 | Murphy | G01S 3/043 342/417 |
| 2015/0261895 | A1* | 9/2015 | Schroeder | H04B 17/3912 703/2 |
| 2016/0035225 | A1* | 2/2016 | Berckefeldt | G08G 5/0078 342/32 |
| 2016/0233949 | A1* | 8/2016 | Tillet | H04W 4/029 |

OTHER PUBLICATIONS

Noise-cancelling headphones from Wikipedia, the free encyclopedia; https://en.wikipedia.org/wiki/Noise-cancelling_headphones; Jul. 28, 2015; 3 pages.

* cited by examiner

SIMULATING RECEPTION OF TRANSMISSIONS

TECHNICAL FIELD

The disclosure relates generally to simulating reception of radio frequency ("RF") transmissions, and, in some implementations, simulating satellite-based reception of automated dependent surveillance broadcast ("ADS-B") transmissions by aircraft.

SUMMARY

According to one implementation, a method includes receiving simulated RF transmission data indicative of anticipated RF transmissions from a plurality of transmitters, wherein individual anticipated RF transmissions carry corresponding messages, and simulated position data indicative of an anticipated position of each of the plurality of transmitters. The method further includes modeling characteristics of a communications channel expected between a satellite-based receiver and at least some of the transmitters, wherein the satellite-based receiver is configured to define one or more beams for receiving anticipated RF transmissions. The method additionally includes determining a likelihood of the receiver successfully extracting one or more components of a message from one of the anticipated RF transmissions based on at least the simulated RF transmission data, the simulated position data, and the modeled characteristics of the communications channel.

According to another implementation, a simulation environment includes a processor coupled a memory module and configured to receive RF transmission data indicative of anticipated RF transmissions from a plurality of simulated transmitters. The plurality of transmitters may simulate various aircraft-mounted ADS-B transmitters, ground-based RF transmitters, and/or other anticipated interference producing modules. Simulated position data indicative of an anticipated position or orientation at least some of the plurality of transmitters with respect to a satellite-based receiver is also received. For example, the position data may be based on historical flight paths that simulate the positions of aircraft equipped with ADS-B transmitters. The satellite-based receiver may define one or more beams for receiving the anticipated RF transmissions. The simulation environment models anticipated RF transmissions, including ADS-B transmissions, received within individual beams of the satellite-based receiver.

Other features of the present disclosure will be apparent in view of the following detailed description of the disclosure and the accompanying drawings. Implementations described herein, including the above-described implementations, may include a method or process, a system, or computer-readable program code embodied on computer-readable media.

BRIEF DESCRIPTION OF THE DRAWINGS

For a more complete understanding of the present disclosure, reference now is made to the following description taken in connection with the accompanying drawings.

DETAILED DESCRIPTION

Traditionally, air traffic control, aircraft surveillance, and flight path management services have relied on ground-based radar stations and surveillance data processing systems. These systems rely on aircraft-based radio transmitters and terrestrial interrogation and receiving stations to implement systems, such as, for example, primary surveillance radar ("PSR"), secondary surveillance radar ("SSR"), and/or mode select ("Mode S") radar, for communicating aircraft position and monitoring information to local ground stations. The information received at the local ground stations is then relayed to regional or global aircraft monitoring systems. Such conventional radar-based systems for use in air traffic control, aircraft surveillance, and flight path management services are limited to use in regions in which the appropriate ground infrastructure exists to interrogate and receive messages from aircraft. Consequently, vast areas of the world's airspace (e.g., over the oceans and poles, remote and/or mountainous regions, etc.) are not monitored by conventional, terrestrial radar-based systems.

Recently, modernization efforts have been launched to replace radar-based air traffic control, aircraft surveillance, and flight management systems with more advanced automatic ADS-B based systems. In an ADS-B-based system, an aircraft determines its position using a satellite-based navigation system (e.g., the Global Positioning System ("GPS")) and periodically broadcasts its position and, in some cases, other information (e.g., velocity, time, and/or intent, among other information), thereby enabling the aircraft to be tracked. ADS-B-based systems may utilize different data links and formats for broadcasting ADS-B messages. 1090 MHz Mode S ES is an example of one such data link which has been adopted in many jurisdictions. For example, in the United States, the Federal Aviation Administration ("FAA") has mandated 1090 MHz Mode S ES for use by air carrier and private or commercial operators of high-performance aircraft. Like traditional radar-based systems, ADS-B-based systems require appropriate infrastructure for receiving ADS-B messages broadcast by aircraft. As a result, even as numerous jurisdictions transition to terrestrial, ADS-B-based systems, air traffic in vast airspaces remains unmonitored.

To address this limitation of terrestrial ADS-B systems, satellite-based receivers can be used to receive ADS-B messages broadcast by aircraft, and such ADS-B messages then can be relayed back down to earth terminals or other terrestrial communications infrastructure for transmission to and use by air traffic control, aircraft surveillance, and flight path management services.

Figure 1:
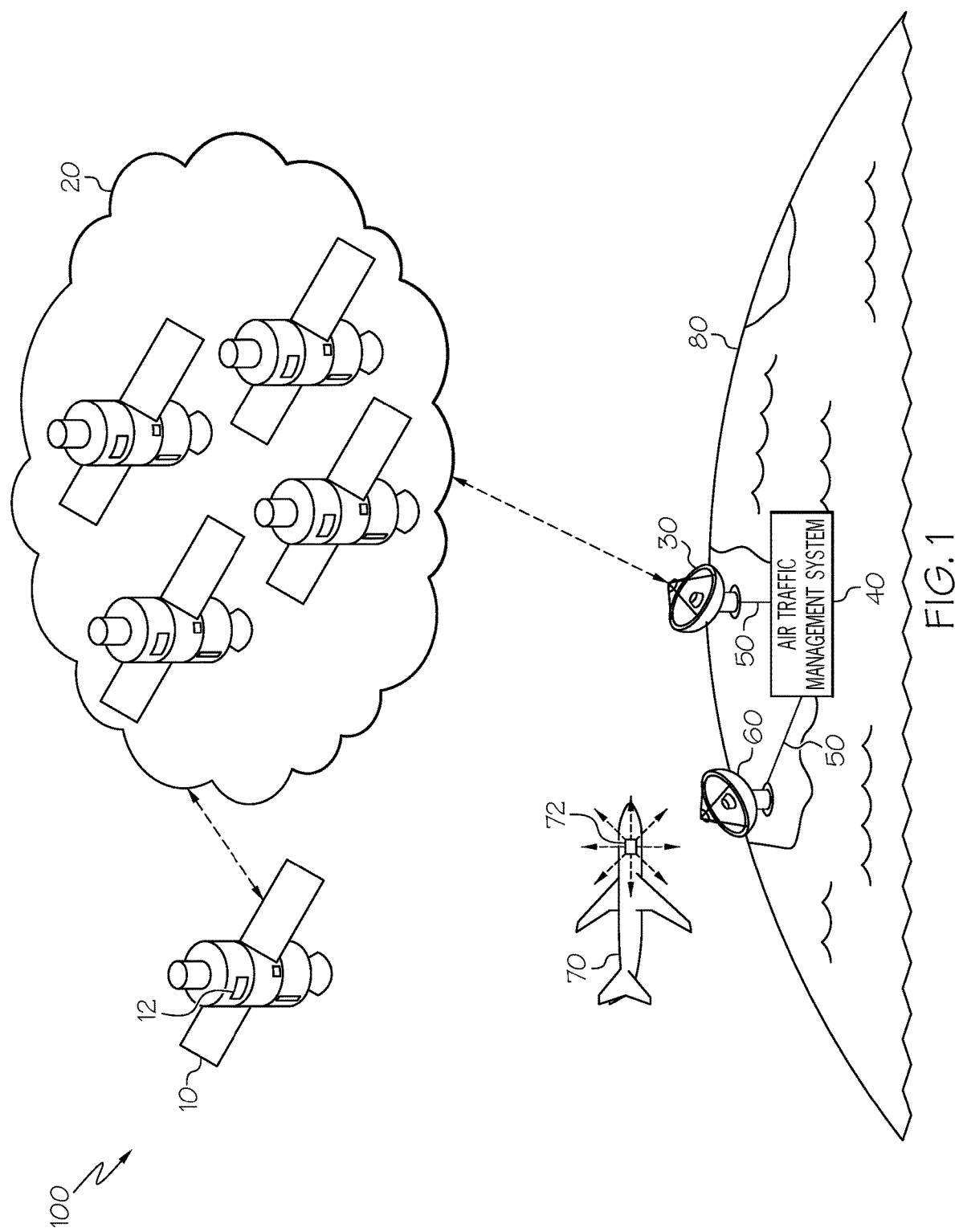
FIG. 1 is a high level block diagram of an example of an air traffic management system ecosystem in accordance with a non-limiting implementation of the present disclosure.

For example and with reference to FIG. 1, a high-level block diagram of one example of a space-based ADS-B system 100 is illustrated in accordance with the present disclosure. System 100 includes satellite 10 in communication with and part of satellite network 20, and aircraft 70. In some implementations, satellite network 20, including satellite 10, may be a low Earth orbit ("LEO") constellation of cross-linked communications satellites. As illustrated in FIG. 1, terrestrial ADS-B ground station 60, air traffic management system 40 and satellite communication network earth terminal 30 are located on Earth 80's surface.

Aircraft 70 carries an on-board ADS-B transponder 72 that broadcasts ADS-B messages containing flight status and tracking information. Satellite 10 carries payload 12 to receive ADS-B messages broadcast by aircraft 70 and other aircraft. In some implementations, multiple or all of the satellites in satellite network 20 may carry ADS-B payloads to receive ADS-B messages broadcast by aircraft. Messages received at receiver 12 are relayed through satellite network 20 to satellite communication network earth terminal 30 and ultimately to air traffic management system 40 through terrestrial network 50. The air traffic management system 40 may receive aircraft status information from various aircraft and provide additional services such as air traffic control and scheduling or pass appropriate information along to other systems or entities.

In some implementations, ADS-B payload 12 may have one or more antennas and one or more receivers for receiving ADS-B messages broadcast by aircraft. Additionally or alternatively, in some implementations, ADS-B payload 12 may have a phased array antenna formed from multiple antenna elements that collectively are configured to provide multiple different beams for receiving ADS-B messages.

In certain implementations, satellite network 20 may have a primary mission other than receiving ADS-B messages broadcast by aircraft. For example, in some implementations, satellite network 20 may be a LEO, mobile satellite communications constellation. In such implementations, ADS-B payloads like ADS-B payload 12 may be hosted on satellites 10 of satellite network 20 as hosted or secondary payloads that may be considered secondary to the primary mission of the satellite network 20. Consequently, such ADS-B payloads when operated as hosted payloads may be constrained by certain limitations, such as, for example, a relatively low maximum weight and a relatively low power budget so as not to take away from the primary mission of the satellite network 20.

Terrestrial ADS-B ground station 60 provides aircraft surveillance coverage for a relatively small portion of airspace, for example, limited to aircraft within line of sight of ground station 60. Even if terrestrial ADS-B ground stations like ground station 60 are widely dispersed across land regions, large swaths of airspace (e.g., over the oceans) will remain uncovered. Meanwhile, a spaced-based ADS-B system 100 utilizing a satellite network like satellite network 20 may provide coverage of airspace over both land and sea regions without being limited to areas where ground-based surveillance infrastructure has been installed. Thus, a space-based ADS-B system may be preferable (or a valuable supplement) to terrestrial approaches.

However, implementing a spaced-based ADS-B system, such as, for example, system 100 may present a number of challenges. For instance, as illustrated in FIG. 1, the distance between transponder 72 on an aircraft 70 and terrestrial ADS-B ground station 60 may be much shorter than the distance between a transponder 72 on an aircraft and a satellite 12, which may be, for example, in low-Earth orbit. For example, a typical terrestrial ADS-B ground station like ADS-B ground station 60 may have a typical maximum range of approximately 150 miles whereas a satellite in low-Earth orbit may orbit the Earth at an altitude as high as approximately 1,243 miles. This significant difference in propagation distance for ADS-B messages may make successful detection and reception of ADS-B messages by a satellite-based ADS-B receiver much more difficult than by a terrestrial-based ADS-B receiver. Furthermore, satellites in low-Earth orbit may orbit the Earth at speeds upwards of 17,000 miles per hour, resulting in Doppler shifts that add additional complications to successfully receiving ADS-B messages. Moreover, given the wider coverage area provided by a satellite as compared to a terrestrial ground station, a satellite-based ADS-B receiver may be exposed to a much higher volume of ADS-B messages than a terrestrial-based ADS-B receiver. This increased volume of received ADS-B messages only compounds the difficulty of successfully detecting and receiving ADS-B messages with a satellite-based ADS-B receiver relative to a terrestrial-based ADS-B receiver.

For terrestrial ADS-B receivers, the physical channel may be assumed to exhibit the characteristics of an interference channel, where interference and/or noise may result from interference or noise in the physical channel itself as well as interference or noise in the antenna or receiver. Interference and/or noise in the physical channel may result from multiple aircraft within range of a terrestrial ADS-B receiver broadcasting ADS-B messages in a fashion that is uncoordinated in time. As a result, ADS-B messages that arrive at the terrestrial receiver may interfere and/or overlap with one another. ADS-B messages that interfere and/or overlap with a desired ADS-B message may be referred to as false replies unsynchronized with interrogator transmissions or, alternatively, false replies unsynchronized in time ("FRUIT").

Other communications protocols that share the 1090 MHz band with ADS-B also may contribute interference and be a source of FRUIT. For example, aircraft implementing secondary surveillance radar ("SSR") like Mode A, Mode C, or Mode S, may respond to interrogating SSR messages in the 1090 MHz band, potentially creating interference for ADS-B messages. Other transmitters within range of a terrestrial ADS-B receiver transmitting in neighboring or nearby frequency bands also may generate interference or contribute to noise in the physical channel. Appropriately dealing with FRUIT and other interference/noise, particularly for airspaces with a high density of air traffic, may be one challenge faced by a terrestrial ADS-B receiver.

Another challenge faced by a terrestrial ADS-B receiver may be the so-called near-far problem where a signal received at the ADS-B receiver from a relatively nearby aircraft is significantly stronger than a signal received at the ADS-B receiver at the same time from an aircraft that is relatively far from the ADS-B receiver.

As discussed above, some of the challenges faced by a space-based ADS-B receiver may be even more imposing than those faced by a terrestrial ADS-B receiver due to, for example, but not limited to, the significantly greater propagation distance between aircraft broadcasting ADS-B messages and the space-based ADS-B receiver, significant Doppler shifts due to the orbital velocity of a satellite, and/or the significantly greater volume of ADS-B messages within the coverage area of a space-based ADS-B receiver relative to a terrestrial ADS-B receiver. Different from the physical channel for a terrestrial ADS-B receiver, the physical channel for a space-based ADS-B receiver may be dominated by noise. Because of this additional noise, the signal-to-noise ratio ("SNR") for an ADS-B message received by a space-based ADS-B receiver typically will be much lower than the SNR for an ADS-B message received by a terrestrial ADS-B receiver.

Additional examples of challenges that may be faced when implementing a spaced-based ADS-B system include that, in certain implementations, individual satellites 10 (or ADS-B payloads 12) may have limited power budgets within which to operate and/or the satellite network 20 as a whole may have a limited, system-wide power budget within which to operate or face other constraints. As such, the individual satellites 10 (or ADS-B payloads 12) and/or the satellite network 20 as a whole may benefit from intelligent management of resources to achieve desired performance levels without exceeding allowed power budgets.

In one example, such management of resources may include selecting a subset of less than all satellites of satellite network 20 to provide desired service coverage during different time periods.

Figure 2:
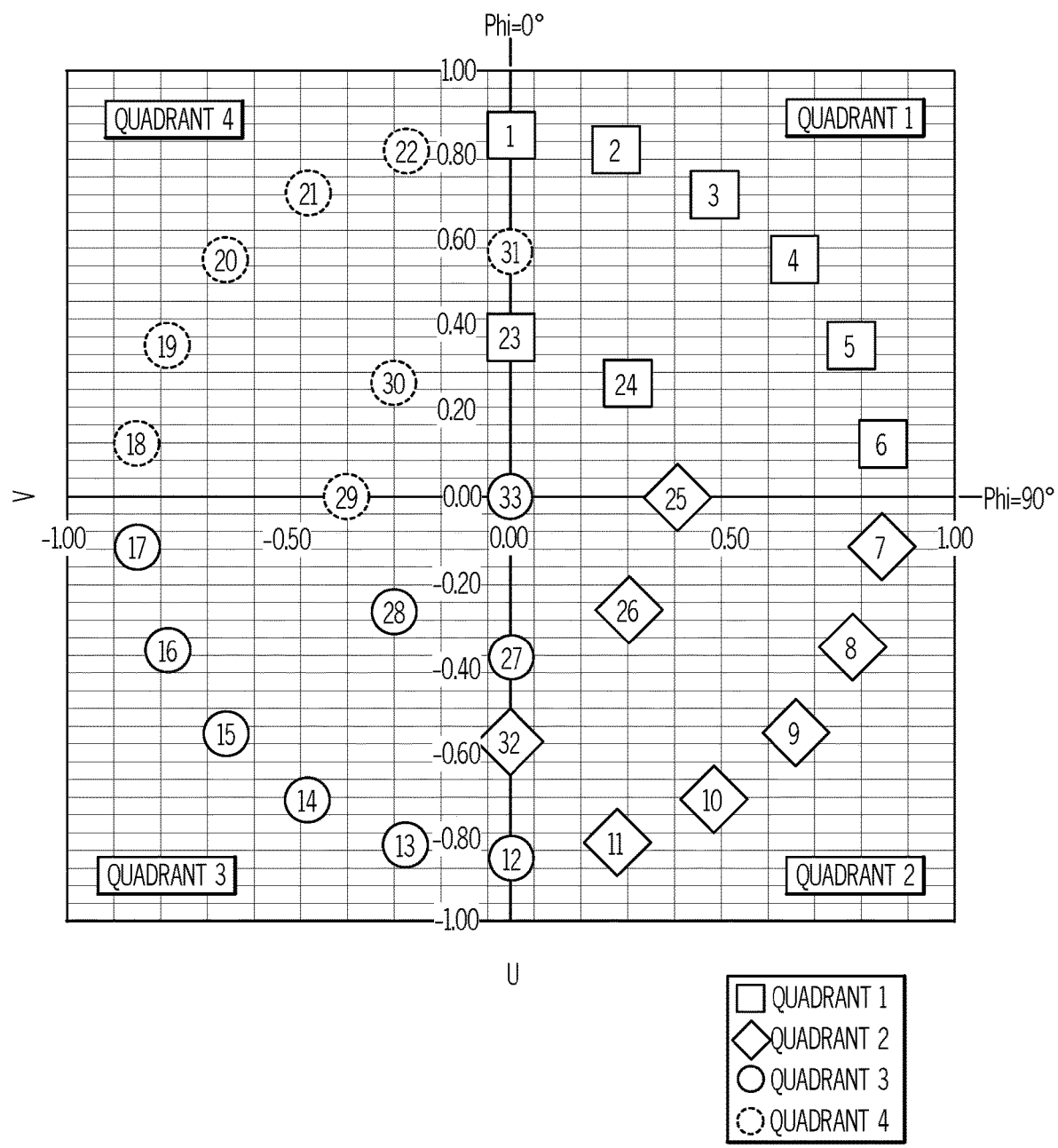
FIG. 2 is an example of a beam pattern in accordance with a non-limiting implementation of the present disclosure.

Furthermore, in another example, individual satellites 10 (or ADS-B payloads 12) may be configured to provide multiple different coverage beams for receiving ADS-B messages and may benefit from intelligent management of beam scheduling to achieve desired coverage without exceeding allowed power budgets. Referring now to FIG. 2, in one specific implementation, each individual satellite 10 (or ADS-B payload 12) may be configured to have 33 different beams, for example, laid out as illustrated in the example beam pattern illustrated in FIG. 2. However, power (or other resource constraints) may prevent the concurrent use of all 33 beams at the same time. For example, operating all 33 beams at the same time may cause an individual satellite 10 (or ADS-B payload 12) to exceed its allowed power budget. Additionally or alternatively, size and/or processing constraints may not allow for 33 individual receivers on board satellite 10 (or ADS-B payload 12) for concurrently processing signals received in all 33 beams. Therefore, individual satellites 10 (or ADS-B payloads) may benefit from intelligent beam scheduling to achieve desired coverage within the constraints imposed on or by the satellite 10 (or ADS-B payload 12). In view of the challenges involved in implementing a spaced-based ADS-B system, it may be desirable to develop a simulation environment for simulating a space-based ADS-B system or aspects thereof, for example, for the purposes of assessing the likelihood of a real-world, space-based ADS-B system functioning successfully in the face of one or more different variables. For instance, such a simulation environment may enable the assessment of the likelihood of successful ADS-B message reception during certain time periods and/or at certain rates based on different design choices related to the space-based ADS-B itself and/or various external variables such as FRUIT, air traffic density, etc. In some implementations, results of such implementations may be used to improve the design of a space-based ADS-B system and/or to configure certain aspects of a space-based ADS-B system already in operation.

The teachings of the present disclosure include a simulation environment for modeling a communications channel and assessing the transmission reception capabilities. For instance, the simulation environment may simulate one or more aspects of physical signal transmission/reception, as well as other variables, such as, for example, transmission power, transmitter orientation (e.g., on top of an aircraft or underneath the aircraft), air traffic density, etc. to provide an end-to-end solution for simulating space-based ADS-B systems.

Such a simulation environment may include various modules for simulating one or more of these variables. The outputs of such modules may be combined by a tool that outputs a stream of mission data that simulates the mission data that a real-world space-based ADS-B receiver or a real-word overall space-based ADS-B system may be expected to output in such a scenario.

In one example, a simulation environment may include a traffic generation module that simulates global (or regional) air traffic during a certain time period, including simulating aircraft trajectories, flight paths, and other characteristics. Additionally or alternatively, the simulation environment may generate simulated ADS-B messaging associated with the simulated air traffic, which may be dependent upon simulated aircraft positioning data, for example, generated by a traffic generation module.

As another example, a simulation environment may include a FRUIT module that projects aircraft counts in certain areas and simulates message transmissions, possibly including message transmission according to different messaging protocols, by individual aircraft and/or other transmitters within the area(s). For example, the FRUIT module may simulate different percentages of messages that are expected to be sent as Mode S, air traffic control radar beacon system ("ATCRBS"), or ADS-B messages. In some implementations, output from the FRUIT module may be used in modeling characteristics of the communications channel(s) between the space-based ADS-B receiver(s) and one or more ADS-B transmitters.

The descriptions and implementations disclosed herein may be described in connection with particular examples of simulation environments. However, the descriptions and implementations disclosed herein may have broader applicability than such particular examples and should not be limited to such particular examples.

Figure 3:
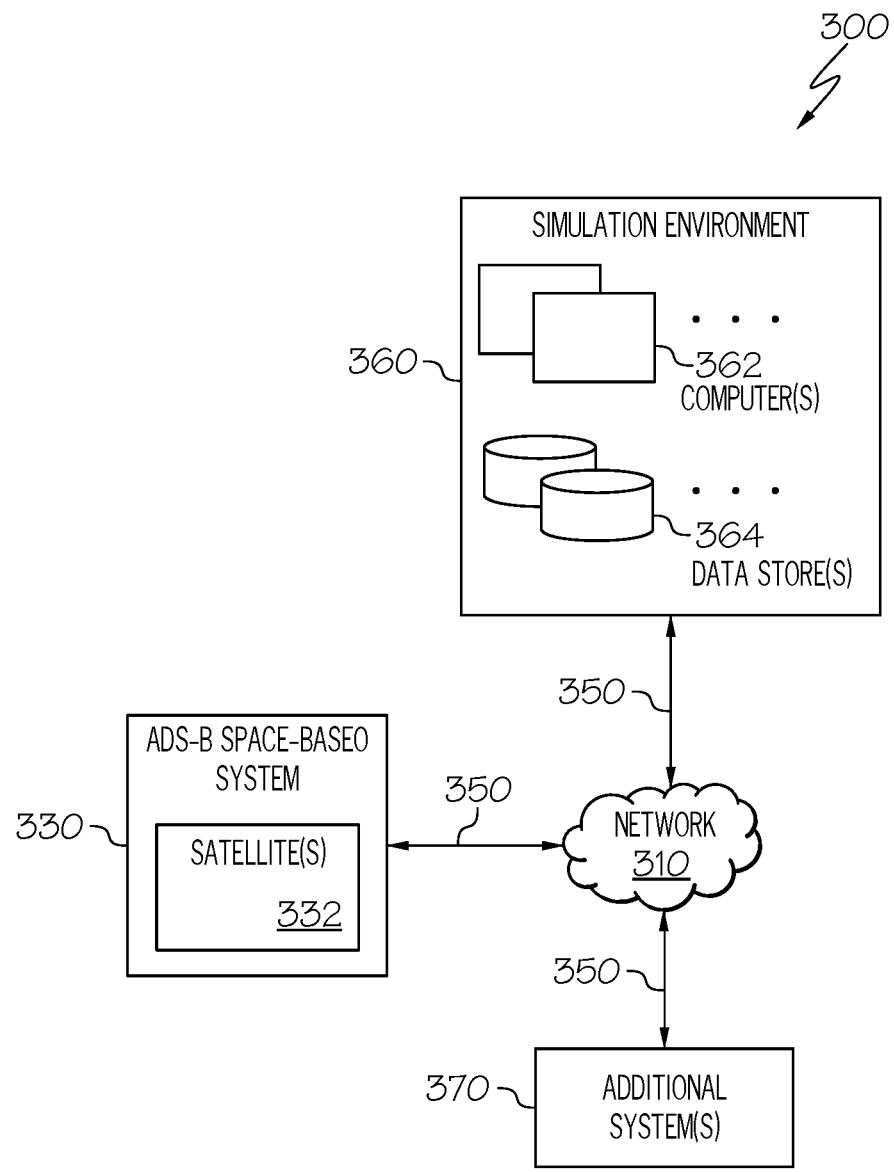
FIG. 3 is a high level block diagram of an example of a system in accordance with a non-limiting implementation of the present disclosure.

With reference to FIG. 3, one example of a system 300 is illustrated in accordance with a non-limiting embodiment of the present disclosure. Simulation environment 360 includes one or more computers 362 and one or more data store(s) 364. In some implementations, simulation environment 360 may implement one or more of the simulation techniques disclosed herein. Space-based ADS-B system 330 includes satellite 332. In some implementations, space-based ADS-B system 330 may be configured to receive ADS-B messages transmitted by ADS-B transmitters (e.g., on board aircraft) using ADS-B receivers hosted on in-orbit satellites. Simulation environment 360 and space-based ADS-B system 330 may be connected by a network 310. In certain implementations, simulation environment 360 also may include and/or be connected to one or more input systems that provide input to simulations performed by the simulation environment 360.

Simulation environment 360 also may be connected to one or more additional systems 370, for example, for receiving input data or transmitting simulation results. For example, a simulated air traffic control ("ATC") system may be configured to receive simulation results from simulation environment 360. Such a configuration may facilitate the testing of the real-world accuracy, timing, and/or transmission rates of such results. Such additional systems 360 may also provide input data, such as, for example, flight plan data and/or satellite ephemeris data, for simulation environment 360.

In certain implementations, simulation environment 360 may communicate directly with space-based ADS-B system 330 and/or results of simulations performed by simulation environment 360 may be used to configure certain aspects of the space-based ADS-B system 330, including, but not limited to, certain configurable aspects of the ADS-B receiver(s) hosted on satellite(s) 332, such as, for example, beam patterns or beam laydown tables of such receivers.

Figure 4:
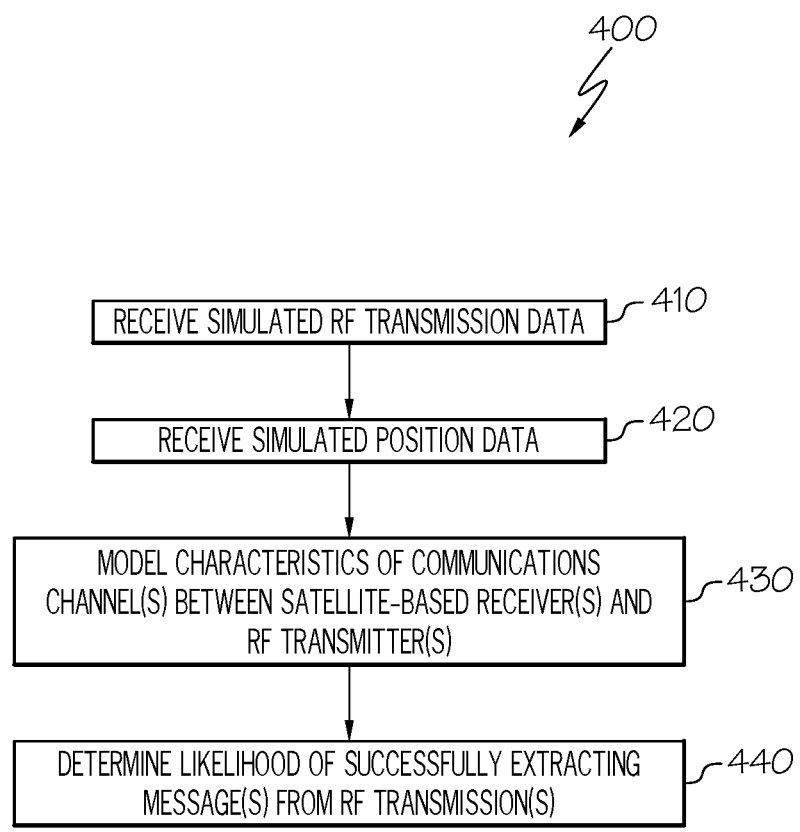
FIG. 4 is a flow chart of a method for simulating message reception in accordance with a non-limiting implementation of the present disclosure.

With reference to FIG. 4, a flow chart 400 of a method for simulating reception of messages is illustrated. At step 410 simulated RF transmission data indicative of anticipated RF transmissions from multiple transmitters is received. For example, simulated ADS-B messages transmitted by ADS-B transmitters on board aircraft and associated characteristics, such as, for example, carrier frequency, transmission power, transmission, rate, and the like may be received. Similarly, at step 420, simulated position data indicative of anticipated positions of the transmitters is received. For example, flight paths of aircraft (e.g., based on actual historical flight paths) may be received. Together with the RF transmission data, this position data may enable the simulation of ADS-B messages transmitted by multiple aircraft within a region or around the world during some period of time.

At step 430, characteristics of one or more communications channels expected between one or more satellite-based receivers and one or more of the RF transmitters are modeled. In some implementations, this modeling may involve simulating beam gain and/or beam selection patterns of the one or more receivers. Additionally or alternatively, this modeling may involve modeling miscellaneous RF transmissions from various different sources including aircraft and other transmitters from other applications, for example, to provide a realistic view of the communications channel(s). Furthermore, in some implementations, this modeling may involve modeling the distance between and the relative orientation of the transmitter(s) and the receiver(s), for example, based on satellite ephemeris or other data for simulating the orbit(s) and position(s) of the satellite(s) that host the receiver(s). Propagation distance and noise levels in the communications channel(s) may factor considerably into the ability of a space-based ADS-B system to successfully receive one or more ADS-B messages. Accordingly, simulating positioning and timing of messages transmitted by simulated transmitter and positioning of the satellite-based receiver(s) may be useful to assessing the success of the system under real-world conditions.

At step 440, the likelihood of one or more of the receivers successfully extracting one or more messages (or one or more components of the message(s)) from one or more of the anticipated RF transmissions is determined based on at least the simulated RF transmission data, the simulated position data, and the modeled characteristics of the communications channel. In some implementations, determining the likelihood of successful extraction may involve simulating the use of noise reduction and low power message processing techniques, such as, for example, noise filtering and multi-stage signal detection algorithms, to exclude noise and interference in the communications channel and extract intended ADS-B messages. Additionally or alternatively, in some implementations, successfully extracted messages may be packaged and transmitted to simulated ATC.

Figure 5:
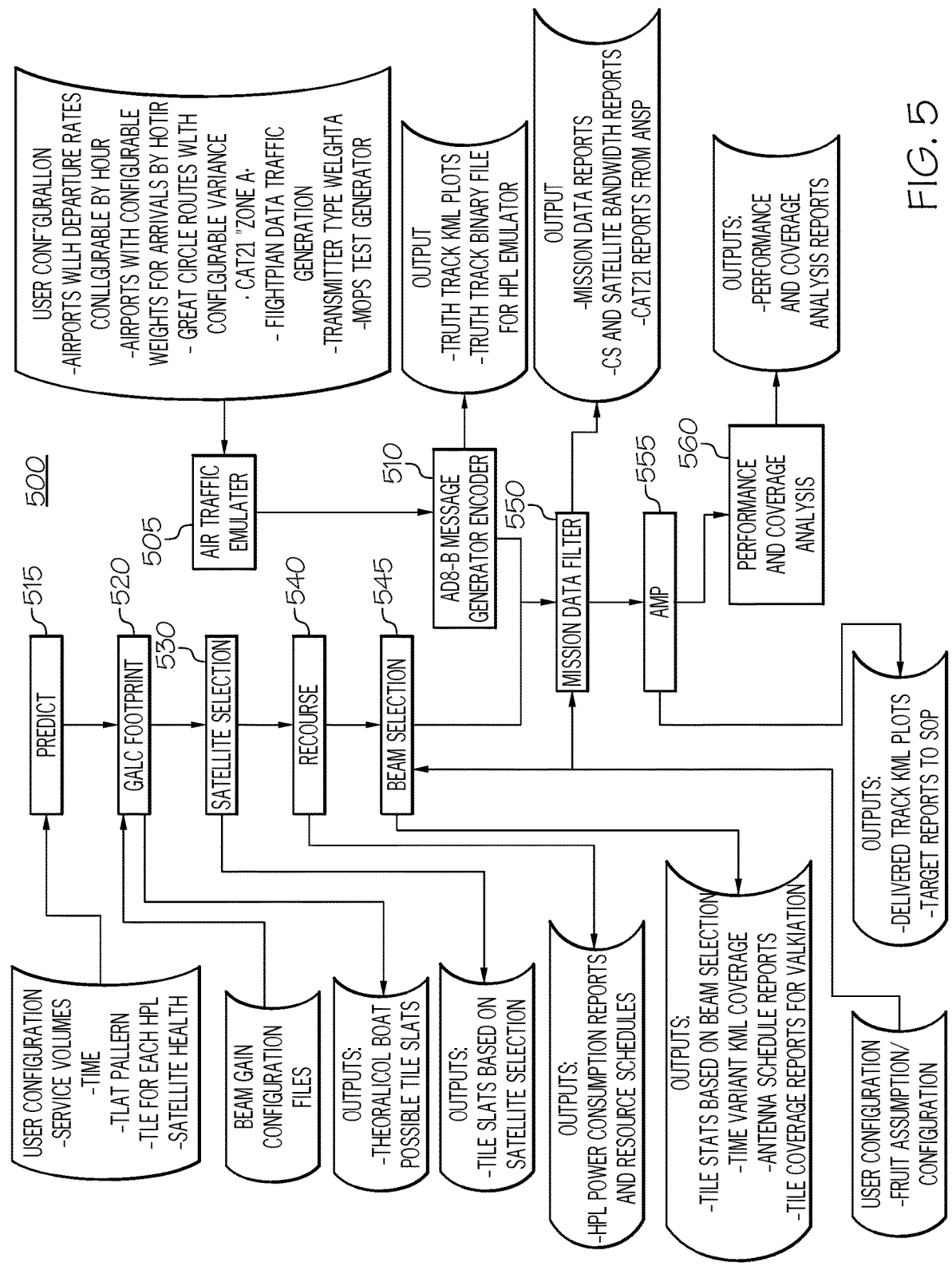
FIG. 5 is a block diagram of an example of an architecture for a simulation environment in accordance with a non-limiting implementation of the present disclosure.

An example architecture 500 of a simulation environment is shown in FIG. 5. With reference to FIG. 5, the left-side modules may simulate aspects of the space-based ADS-B system. The modules on the right side, meanwhile, may simulate ADS-B transmitters (e.g., on board aircraft) and other transmitters that may impact the ability of the space-based ADS-B system to successfully receive ADS-B messages transmitted by the ADS-B transmitters.

The mission data filter module 550 merges outputs from the left-side and right-side modules together to produce a filtered down "stream" of mission data simulating data received by the space-based ADS-B system. The ADS-B Message Processor ("AMP") module 555 then exercises compact position reporting ("CPR") decoding algorithms on the mission data output by the mission data filter module 550 to generate position reports for the simulated aircraft-borne ADS-B transmitters. These reports then may be analyzed by the performance and coverage module 560 to assess the performance of the space-based ADS-B system under the simulated conditions and design choices. For example, these reports may be analyzed by the performance and coverage module 560 to determine the likelihood of the space-based ADS-B system successfully receiving ADS-B messages broadcast by aircraft-borne ADS-B transmitters under the simulated conditions and design choices. In one particular implementation, the performance and coverage module 560 analyzes the reports to determine the probability of detection by the space-based ADS-B system of aircraft-borne ADS-B transmitters within certain time intervals and, in some cases, in certain geographic regions.

Individual ones of the modules shown in FIG. 5 are now described in greater detail.

1. Traffic Generation and ADS-B Message Generating/Encoding

In certain implementations, an air traffic emulator module 505 generates simulated aircraft traffic during a desired time period. Depending on the implementation, the air traffic emulator module 505 may receive one or more of the following as input: (i) flight departure rates by airport, (ii) flight arrival rates by airport, (iii) great circle routes between various airports, (iv) historical flight path data for actual flights during a particular time period, and (v) ADS-B transmitter type information (e.g., for simulating different types of transmitters (for example with different transmit powers) on different simulated aircraft transmitting simulated ADS-B messages). An ADS-B message generating and encoding module 510 uses the simulated aircraft traffic generated by the air traffic emulator module 505 to generate simulated ADS-B messages transmitted by the aircraft. For example, DO-260B rules for encoding and transmit rates of respective message types and transmitters may be used to convert the simulated aircraft traffic into simulated ADS-B messages.

In some implementations, the simulated ADS-B messages may be used as baseline "Truth," for example, for the purposes of determining the likelihood of the space-based ADS-B system successfully receiving ADS-B messages under the simulated conditions and design choices and/or within what update intervals the space-based ADS-B system is likely to successfully receive ADS-B messages transmitted by the simulated aircraft. For example, since this data represents the original transmission stream of messages, it may be used to compare against the simulated received message set.

2. Predict Module

In certain implementations, the predict module 515 performs satellite position and orbit simulation. For example, in some implementations, the predict module 515 may use satellite ephemeris and satellite configuration data and a desired simulation time to simulate the positioning of satellites with respect to individual coverage tiles (e.g., 1°×1° tiles on a latitude/longitude grid on the Earth) for each increment of the simulation.

In certain implementations, the predict module 515 may produce a tile matrix, which defines the angle and range between each tile in a desired service volume coverage area and each satellite. Additionally or alternatively, the predict module 515 may also output a satellite/ADS-B receiver matrix, which defines one or more of satellite position, satellite footprint radius, and eclipse parameters for each satellite. These output matrices may be used by subsequent modules, for example, to simulate satellite coverage of desired coverage areas.

3. Calculate Footprint Module

In certain implementations, the calculate footprint module 520 models the performance of the satellite-based receivers with respect to individual tiles. For example, in some implementations, the calculate footprint module 520 may calculate numerical values that represent measures of the performance of each beam (or at least some of the individual beams) of the satellite with respect to individual tiles. In one particular implementation, the calculate footprint module 520 uses specific link budget information to calculate $E_b/N_O$ values for individual receiver beam/tile pairs.

In certain implementations, the calculate footprint module 520 may receive as input the tile matrix output by the predict module 515 as well as beam gain patterns for individual beams of the satellite-based receivers (e.g., as a function of nadir angle, azimuth). Additionally or alternatively, in such implementations, the calculate footprint module 520 also may receive as input TLAT antenna gain patterns (e.g., as a function of elevation angle between a tile (or aircraft antenna) and a satellite-based receiver where gain may be uniform in azimuth). Based on input received, the calculate footprint module 520 then may calculate $E_b/N_O$ values for individual receiver beam/tile pairs as a measure of the performance of individual receiver beams with respect to individual tiles. In certain implementations, in calculating individual $E_b/N_O$ values for receiver beam/tile pairs, the calculate footprint module 520 may model atmospheric attenuation (e.g., using a Centre national d'études spatiales ("CNES") model), free space path loss (e.g., based on slant range), energy per bit (e.g., based on modeled received power) (including polarization losses, etc.), receiver bandwidth, and/or noise density (e.g., based on modeled noise temperature parameters for the satellite-based receiver).

In certain implementations, the calculate footprint module 520 may generate an output matrix of $E_b/N_O$ values for each beam of each receiver relative to each individual tile.

4. Payload Selection

In certain implementations, a payload selection module 530 generates output that models which satellite-based receivers will be available for receiving ADS-B signals during different periods of time relevant to a simulation. As discussed above, in some implementations, individual receivers may be powered down or otherwise disabled from receiving signals, for example in order to satisfy certain power budgets. Payload selection module 530, therefore, may model which receivers are available for receiving ADS-B signals during different time periods of the simulation.

5. Resource Planning

In certain implementations, a resource planning module 540 generates output that models resources (e.g., power and/or bandwidth) that are available to individual satellite-based receivers that are available for receiving ADS-B signals during different periods of time relevant to a simulation. As discussed above, in some implementations, the power available to individual receivers may be limited during different periods of time, for example, in order to satisfy certain power budgets. Resource planning module 540, therefore, may model the resources available to individual receivers (e.g., power and/or bandwidth) that are available for receiving ADS-B signals during different time periods of the simulation.

6. Beam Selection

In certain implementations, a beam selection module 545 generates output that models the performance of individual beams of satellite-based receivers that are available for receiving ADS-B signals during different periods of time with respect to individual tiles. As discussed above, in some implementations, in order to satisfy certain power budgets, individual receivers may be powered down or otherwise disabled from receiving signals during different time periods, and even those receivers that remain available for receiving signals may have limited resources available for receiving signals. Beam selection module 545, therefore, may receive output from the payload selection module 530 and/or the resource planning module 540 and, based on this input, determine individual beams of satellite-based receivers that are available for receiving signals during different periods of time relevant to a simulation. Using this data as well as output from the calculate footprint module 520, the beam selection module 545 may generate output that models the performance of the individual beams that are available for receiving signals during different time periods of the simulation with respect to individual tiles. For example, in some implementations, the beam selection module 545 may generate output matrices of $E_b/N_O$ values for individual beams available for receiving signals relative to individual tiles during different time periods of the simulation.

7. Mission Data Filter

As described above, in certain implementations, the mission data filter module 550 merges outputs from the beam selection module 545 and the ADS-B message generating and encoding module 510 to produce a filtered down "stream" of mission data simulating data received by the space-based ADS-B system. For example, in certain implementations, the mission data filter module 550 applies the matrices of $E_b/N_O$ values for individual beams available for receiving signals relative to individual tiles during different time periods of the simulation to the simulated ADS-B messages transmitted by the aircraft generated by the ADS-B message generating and encoding module 510 to model which messages will be received by the space-based ADS-B system and on which beams they are received. Additionally or alternatively, the mission data filter module 550 may model the likelihood that individual messages will be received by the space-based ADS-B system.

In certain implementations, the mission data filter module 550 may account for anticipated FRUIT (e.g., based on input from a FRUIT model described in greater detail below) and/or anticipated channel occupancy (e.g., based on an ALOHA model) in modeling messages that will be received by the space-based ADS-B system and/or the likelihood that individual messages will be received by the space-based ADS-B system.

8. FRUIT Model

A FRUIT model may model FRUIT that may interfere with the space-based ADS-B system's ability to receive ADS-B messages based on projected aircraft counts within individual tiles during specific intervals of time during a simulation (e.g., based on flight plan data or historical, observed air traffic data). In some implementations, the FRUIT model may convert these aircraft counts to expected FRUIT message rates during specific time intervals based on one or more configurable variables, such as, for example, the percentage of Mode S versus the percentage of ATCRBS signals transmitted by the aircraft and the percentage of aircraft having top-mounted transmitters versus the percentage of aircraft having bottom-mounted transmitters. In this manner, the impact of FRUIT message rates on system performance may be accounted for. In certain implementations, the impact of FRUIT message rates on system performance may be estimated using a 3rd order Poisson Arrival Rate approximation of probability of reception in the interference environment.

9. ADS-B Message Processor

In certain implementations, the AMP module 555 processes filtered message data output by the mission data filter module 550 to determine aircraft positions. The AMP module 555 then may generate ADS-B reports, for example, for sending to simulated air traffic controllers. As part of processing filtered message data, the AMP module 555 may implement decoding and processing functions defined in the Radio Technical Commission for Aeronautics' ("RTCA") "DO-260B Minimum Operational Performance Standards for 1090 MHz Extended Squitter Automatic Dependent Surveillance-Broadcast (ADS-B) and Traffic Information Services-Broadcast (TIS-B)," such as, for example, Compact Position Reporting ("CPR") decoding, Global Reasonableness Testing ("GRT"), track acquisition, and state data maintenance.

In certain implementations, statistics related to the ADS-B reports may be stored by the AMP module 555 for analysis, such as, for example, evaluation of the performance of the space-based ADS-B system.

10. Performance and Coverage Analysis

In certain implementations, the performance and coverage analysis module 560 generates performance metrics for simulation runs. Examples of such performance metrics include:
  Update Intervals (e.g., 95th and 99.9th percentiles, EUROCAE metric against 8, 15, and 30 second targets)
  Latency (e.g., between transmission by an aircraft to conclusion of processing and/or consumption by an end user)
  Probability of Long Gap (e.g., the probability of a long gap in updates received by a target aircraft, for instance, on the order of 24, 45, or 90 seconds)
  Bandwidth (e.g., the bandwidth used by the system in transmitting data and/or command and control messages)
  Power (e.g., the power consumed by an individual satellite-based receiver)

In certain implementations, the performance and coverage analysis module 560 may generate system-wide performance metrics. Additionally or alternatively, the performance and coverage analysis module 560 may generate performance metrics for specific regions served (e.g., by service volume), on an individual satellite/payload by satellite/payload basis, or any of a number of other configurable bases.

Aspects of the present disclosure may be implemented entirely in hardware, entirely in software (including firmware, resident software, micro-code, etc.) or in combinations of software and hardware that may all generally be referred to herein as a "circuit," "module," "component," or "system." Furthermore, aspects of the present disclosure may take the form of a computer program product embodied in one or more machine-readable media having machine-readable program code embodied thereon.

Any combination of one or more machine-readable media may be utilized. The machine-readable media may be a machine-readable signal medium or a machine-readable storage medium. A machine-readable storage medium may be, for example, but not limited to, an electronic, magnetic, optical, electromagnetic, or semiconductor system, apparatus, or device, or any suitable combination of the foregoing. More specific examples (a non-exhaustive list) of such a machine-readable storage medium include the following: a hard disk, a random access memory (RAM), a read-only memory (ROM), an erasable programmable read-only memory (EPROM or Flash memory), an appropriate optical fiber with a repeater, an optical storage device, a magnetic storage device, or any suitable combination of the foregoing. In the context of this document, a machine-readable storage medium may be any tangible medium that can contain, or store a program for use by or in connection with an instruction execution system, apparatus, or device, such as, for example, a microprocessor.

A machine-readable signal medium may include a propagated data signal with machine-readable program code embodied therein, for example, in baseband or as part of a carrier wave. Such a propagated signal may take any of a variety of forms, including, but not limited to, electromagnetic, optical, or any suitable combination thereof. A machine-readable signal medium may be any machine-readable medium that is not a machine-readable storage medium and that can communicate, propagate, or transport a program for use by or in connection with an instruction execution system, apparatus, or device. Program code embodied on a machine-readable signal medium may be transmitted using any appropriate medium, including but not limited to wireless, wireline, optical fiber cable, RF signals, etc., or any suitable combination of the foregoing.

Computer program code for carrying out operations for aspects of the present disclosure may be written in any combination of one or more programming languages, including object oriented programming languages, dynamic programming languages, and/or procedural programming languages.

The flowchart and block diagrams in the figures illustrate examples of the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order illustrated in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and machine-readable instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to explain the principles of the disclosure and the practical application, and to enable others of ordinary skill in the art to understand the disclosure with various modifications as are suited to the particular use contemplated.

What is claimed is:

1. A method comprising:
    by one or more processors, receiving:
        simulated radio frequency (RF) transmission data indicative of anticipated RF transmissions from a plurality of transmitters, wherein individual anticipated RF transmissions carry corresponding messages; and
        simulated position data indicative of an anticipated position of each of the plurality of transmitters, wherein each of the plurality of transmitters are simulated as being on board a respective aircraft, each traveling according to a corresponding expected flight plan;
    by the one or more processors, modeling characteristics of a communications channel expected between a satellite-based receiver and at least some of the transmitters, wherein the modeling comprises simulating interference in the communications channel from the anticipated RF transmissions received at the satellite-based receiver, and wherein the satellite-based receiver is configured to define one or more beams for receiving anticipated RF transmissions; and
    by the one or more processors, determining a likelihood of the receiver successfully extracting one or more components of a message from one of the anticipated RF transmissions based on at least the simulated RF transmission data, the simulated position data, and the modeled characteristics of the communications channel.

2. The method of claim 1, wherein determining a likelihood of the receiver successfully extracting the one or more components of the message comprises determining the likelihood of the receiver successfully extracting the one or more components of the message based on an anticipated signal power of the RF transmission and an anticipated orientation of the transmitter with respect to the receiver.

3. The method of claim 1, wherein the position data further indicates an anticipated orientation of each of the plurality of transmitters with respect to the receiver, and wherein the RF transmission data is configured based on the anticipated orientation of each of the plurality of transmitters.

4. The method of claim 1, further comprising determining an anticipated position of the receiver, and wherein modeling characteristics of the communications channel includes modeling characteristics of the communications channel based on the anticipated position of the receiver.

5. The method of claim 4, further comprising determining an expected coverage area of an individual beam based on the expected position of the receiver, wherein modeling characteristics of the communications channel includes modeling characteristics of the communications channel based on the expected coverage area of the individual beam.

6. The method of claim 1, wherein the receiver is configured to define a plurality of beams and modeling characteristics of a communications channel expected between a satellite-based receiver and at least some of the transmitters includes modeling characteristics of communications channels for individual ones of the plurality of beams.

7. The method of claim 6, further comprising determining a respective expected coverage area for each beam, wherein modeling characteristics of a communications channel for an individual one of the beams includes modeling characteristics of the communications channels for the individual beam based on the expected coverage area of the individual beam.

8. The method of claim 6, wherein determining the likelihood of the receiver successfully extracting one or more components of the message comprises determining, for each of multiple beams, the likelihood of the receiver successfully extracting one or more components of the message.

9. The method of claim 8, further comprising determining a particular beam for which a highest number of components of the message is likely to be extracted.

10. The method of claim 1, wherein the satellite-based receiver is simulated as being hosted on a low-earth orbit satellite.

11. The method of claim 10, further comprising determining an anticipated position of at least one of the aircraft based on the corresponding expected flight plan, wherein receiving simulated position data indicative of an anticipated position of each of the plurality of transmitters includes receiving simulated position data indicative of the anticipated position of the particular transmitter based on the determined anticipated position of the at least one of the aircraft based on the corresponding expected flight plan.

12. The method of claim 10, further comprising determining an anticipated position of the satellite based on an expected orbit of the satellite, wherein modeling characteristics of the communications channel includes modeling characteristics of the communications channel based on the determined anticipated position of the satellite.

13. The method of claim 10, wherein modeling characteristics of the communications channel includes modeling the communications channel as including transmissions from a ground-based air-traffic control radar system.

14. The method of claim 1, wherein modeling characteristics of the communications channel includes modeling characteristics of the communications channel based on the anticipated positions of at least some of the transmitters relative to each other.

15. The method of claim 9, further comprising configuring a receiver of an in-orbit satellite to use a beam corresponding to the particular beam to cover a position corresponding to the anticipated position of the transmitter that transmitted the RF transmission including the message for which the likelihood of extraction was determined.

16. The method of claim 9, further comprising determining a beam lay-down schedule for each of a plurality of beams of a receiver of an in-orbit satellite based on results of determining the likelihood of the receiver successfully extracting one or more components of the message.

17. The method of claim 1, wherein the simulated RF transmission data and the simulated position data represent simulated automatic dependent surveillance broadcast (ADS-B) transmissions and simulated flight data respectively.

18. The method of claim 1, further comprising modeling RF reception characteristics associated with each beam with respect to each of a plurality of coverage areas, wherein determining a likelihood of the receiver successfully extracting one or more components of a message from one of the anticipated RF transmissions includes determining a likelihood of the receiver successfully extracting one or more components of the message from the anticipated RF transmission based on modeled reception characteristics associated with at least some of the beams in addition to the simulated RF transmission data, the simulated position data, and the modeled characteristics of the communications channel.

19. A system comprising:
one or more processors; and
a memory coupled to the processors comprising instructions executable by the processors, the processors operable when executing the instructions to:
determine simulated position data indicative of an anticipated position of each of a plurality of transmitters, wherein each of the plurality of transmitters are simulated as being on board a respective aircraft, each traveling according to a corresponding expected flight plan;
determine simulated radio frequency (RF) transmission data indicative of anticipated RF transmissions from each of the plurality of transmitters, wherein at least some of the anticipated RF transmissions are simulated to conform to an automatic dependent surveillance broadcast (ADS-B) transmission protocol;
model characteristics of a communications channel expected between a satellite-based receiver and at least some of the transmitters, wherein the modeling comprises simulating interference in the communications channel from the anticipated RF transmissions received at the satellite-based receiver, and wherein the satellite-based receiver is configured to define one or more beams for receiving anticipated RF transmissions; and
determine a likelihood of the receiver successfully extracting one or more components of a message from one of the anticipated RF transmissions simulated to conform to the ADS-B protocol based on at least the simulated position data, the simulated RF transmission data, and the modeled characteristics of the communications channel.

20. A method comprising:
by one or more processors, receiving flight path data for a plurality of aircraft;
by the one or more processors, determining simulated position data indicative of an anticipated position of each of the plurality of aircraft based on the received flight path data;
by the one or more processors, determining simulated radio frequency (RF) transmission data indicative of anticipated RF transmissions by individual ones of the plurality of aircraft from their corresponding anticipated positions;
by the one or more processors, modeling reception characteristics associated with each of a plurality of beams of a satellite-based receiver with respect to one or more of the anticipated positions of the aircraft, wherein the modeling comprises simulating interference from the anticipated RF transmissions, made by the individual ones of the plurality of aircraft from their corresponding anticipated positions, received at the satellite-based receiver; and
by the one or more processors, determining a likelihood of the receiver successfully extracting one or more components of a message from one of the anticipated RF transmissions based on at least the RF data and the modeled reception characteristics associated with beams of the satellite-based receiver.

\* \* \* \* \*